(12) United States Patent
Watanabe et al.

(10) Patent No.: US 6,845,635 B2
(45) Date of Patent: Jan. 25, 2005

(54) METHOD OF MANUFACTURING GLASS SUBSTRATE FOR INFORMATION RECORDING MEDIA, GLASS SUBSTRATE FOR INFORMATION RECORDING MEDIA MANUFACTURED USING THE METHOD, AND INFORMATION RECORDING MEDIUM USING THE GLASS SUBSTRATE

(75) Inventors: Takeo Watanabe, Machida (JP); Takao Miwa, Machida (JP); Satoshi Jibiki, Hachioji (JP); Masamichi Kezuka, Yokkaichi (JP); Kensuke Matsuno, Mie-gun (JP)

(73) Assignee: Hoya Corporation, Tokyo (JP)

( * ) Notice: Subject to any disclaimer, the term of this patent is extended or adjusted under 35 U.S.C. 154(b) by 22 days.

(21) Appl. No.: 09/992,961

(22) Filed: Nov. 5, 2001

(65) Prior Publication Data

US 2002/0108400 A1 Aug. 15, 2002

(30) Foreign Application Priority Data

Nov. 6, 2000 (JP) ........................................ 2000-337433

(51) Int. Cl.$^7$ .............................................. C03B 21/00
(52) U.S. Cl. ................................ 65/30.14; 65/61; 65/65; 65/104; 65/105; 65/111; 65/113; 219/121.6; 219/121.61; 219/121.66; 219/121.76
(58) Field of Search ...................... 65/30.14, 61, 65, 65/104, 105, 111, 113, 120, 271; 219/121.6, 121.61, 121.66, 121.76, 121.78, 121.82

(56) References Cited

U.S. PATENT DOCUMENTS

| | | | | |
|---|---|---|---|---|
| 3,819,349 A | * | 6/1974 | Shimizu et al. | ................. 65/63 |
| 4,803,106 A | * | 2/1989 | Lenhart et al. | ............ 428/65.6 |
| 5,697,998 A | * | 12/1997 | Platus et al. | .................. 65/104 |
| 5,725,625 A | * | 3/1998 | Kitayama et al. | .......... 65/30.14 |
| 6,521,862 B1 | * | 2/2003 | Brannon | ................ 219/121.66 |
| 2002/0121110 A1 | | 9/2002 | Saito et al. | |
| 2002/0197437 A1 | | 12/2002 | Hashimoto et al. | |
| 2003/0003763 A1 | | 1/2003 | Kurachi et al. | |
| 2003/0109202 A1 | | 6/2003 | Matsuno et al. | |
| 2003/0110803 A1 | | 6/2003 | Saito et al. | |

* cited by examiner

Primary Examiner—Sean Vincent
(74) Attorney, Agent, or Firm—Frishauf, Holtz, Goodman & Chick, P.C.

(57) ABSTRACT

There are provided a method of manufacturing a glass substrate for information recording media that allows the inner and outer peripheral edge surfaces of the glass substrate for information recording media to be smoothed easily and inexpensively, a glass substrate for information recording media manufactured using this method, and an information recording medium using this glass substrate. A donut-shaped glass disk for information recording media having an outer peripheral edge surface and an inner peripheral edge surface is prepared. At least one of the outer peripheral edge surface and the inner peripheral edge surface of the glass disk is smoothed by melt-heating to a temperature at or above the softening point of the glass by irradiating with at least one laser beam. As a result, at least one of the outer peripheral edge surface and the inner peripheral edge surface of the glass disk becomes smooth and rounded, and hence a polishing step used in a conventional method can be omitted, and moreover chamfering in a grinding step can also be omitted.

35 Claims, 8 Drawing Sheets

METHOD OF MANUFACTURING GLASS SUBSTRATE FOR INFORMATION RECORDING MEDIA, GLASS SUBSTRATE FOR INFORMATION RECORDING MEDIA MANUFACTURED USING THE METHOD, AND INFORMATION RECORDING MEDIUM USING THE GLASS SUBSTRATE

BACKGROUND OF THE INVENTION

1. Field of the Invention

The present invention relates to a method of manufacturing a glass substrate for information recording media, a glass substrate for information recording media manufactured using the method, and an information recording medium using the glass substrate.

2. Prior Art

Information recording media include magnetic disks, optical magnetic disks and optical disks. A magnetic disk, for example, generally has a donut shape with a hole in the center thereof, and a magnetic film that acts as a data recording medium is covered onto one or both major surfaces of the disk. Data is recorded onto such a magnetic disk by means of differences in strength of magnetism.

A glass substrate for such a magnetic disk is usually manufactured through a manufacturing process described below.

Figure 9:
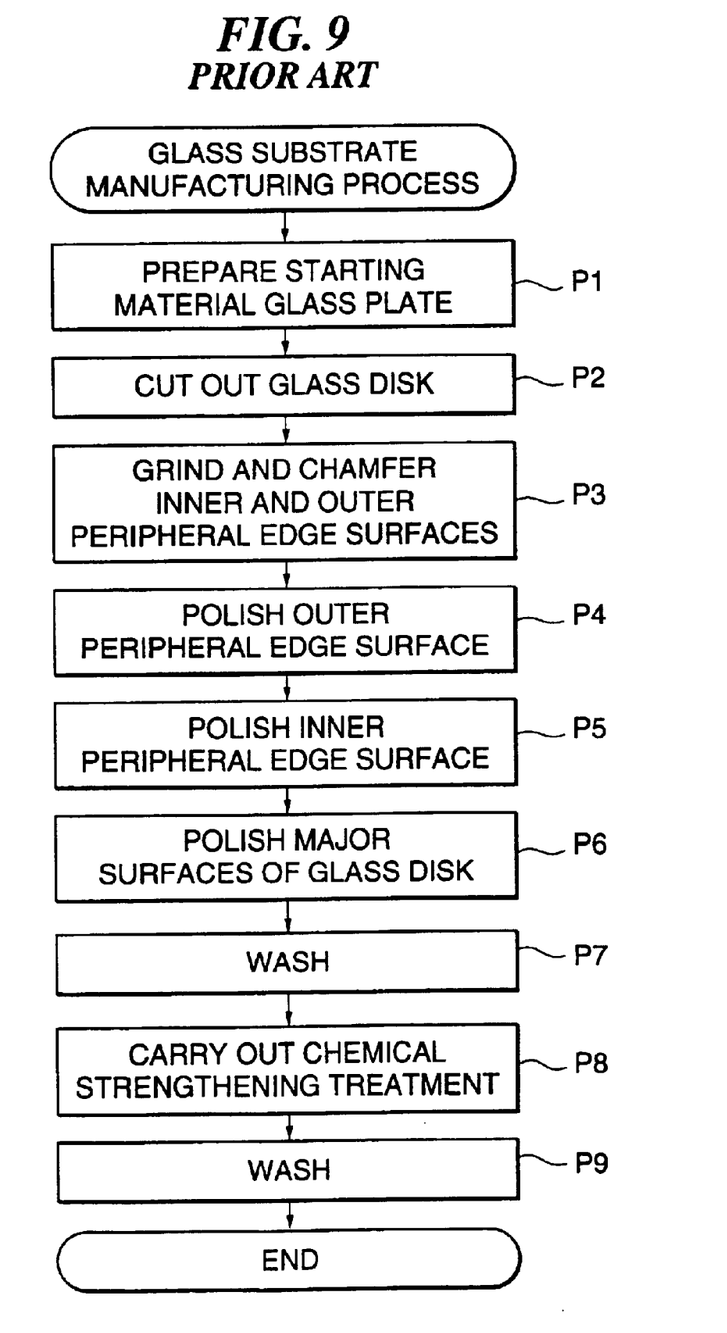
FIG. 9 is a flow chart of a conventional manufacturing process for a glass substrate for a magnetic disk.

FIG. 9 is a flow chart of a conventional manufacturing process for a glass substrate for a magnetic disk.

First, a starting material glass plate of thickness 1.0 mm is prepared (step P1). Next, a donut-shaped glass disk having an outside diameter of 84 mm and an inside diameter of 25 mm is cut out from the starting material glass plate (step P2). The method of doing this is to irradiate with a laser beam along cutting lines to cause strain or insert cutting lines using a wheel cutter, and then cut along the cutting lines. The cutting lines run along the outer periphery and the inner periphery of the glass disk; the outer cutting line is set 0.5 to 1.0 mm outside the outer periphery, and the inner cutting line 0.5 to 1.0 mm inside the inner periphery.

The next step is to grind the cut-out surfaces at the outer and inner peripheries of the glass disk, thus adjusting the outside and inside diameters and also chamfering the cut-out surfaces (step P3). After the grinding, the average roughness Ra is, for example, 0.3 to 0.4 $\mu$m, and the maximum roughness Rmax, for example, 3 to 4 $\mu$m. The grinding is carried out on one glass disk at a time, and is comprised of first stage grinding using a diamond grindstone of #324 roughness (coarse), and second stage grinding using a diamond grindstone of #500 roughness (fine). The chamfering is carried out at an angle of 45°, and 0.15 mm is chamfered at a time.

Next, 30 or so of the glass disks are stacked on top of one another, and the outer peripheral edge surfaces of the glass disks are polished using an outer peripheral edge surface polishing machine (step P4), and then 100 or so of the glass disks are stacked on top of one another, and the inner peripheral edge surfaces of the glass disks are polished using an inner peripheral edge surface polishing machine (step P5). Each of these two polishing steps is carried out by pushing a rotating brush against the surfaces to be polished of the rotating stacked glass disks while spraying a cerium oxide slurry on the surfaces. After the polishing, the average roughness Ra is, for example, 0.05 to 0.4 $\mu$m, and the maximum roughness Rmax, for example, 0.3 to 2.5 $\mu$m.

The major surfaces of the glass disks are then polished by sandwiching the glass disks at the major surfaces between two pads impregnated with a cerium oxide slurry and rotating (step P6). Next, abrasive grains and the like attached to the glass disks are washed off using warm water, alkaline washing water or pure water (step P7), and then the glass disks are strengthened using chemical strengthening treatment (step P8). Finally, salt from the chemical strengthening treatment, foreign matter and the like attached to the glass disks are once again washed off using warm water, alkaline washing water or pure water (step P9).

In general, the inside and outside peripheral edge surfaces of a magnetic disk are not used as data recording surfaces. Nevertheless, the inner and outer peripheral edge surfaces of the glass disk are ground and polished in steps P3 to P5 of the manufacturing process described above, because cracks and undulations inevitably remain on the cut-out surfaces at the inside and outside peripheries of the glass disk after the glass disk is cut out in step P2, and such cracks may lead to fracture of the glass disk, and moreover foreign matter such as abrasive grains that appear during the manufacturing process may collect in the recessed parts of such undulations, and this foreign matter may fly out when the glass disk is used as a magnetic disk and rotated at high speed, adversely affecting the recording surfaces.

The conventional method of manufacturing a glass substrate for information recording media described above, however, suffers from the following problems:

(1) The grinding/chamfering step P3 and the polishing steps P4 and p5 are time-consuming and costly, and moreover variation in surface roughness between glass disks and variation in surface roughness from place to place on a single glass disk occur.

(2) Setting of glass disks must be carried out separately for the inner peripheral edge surface polishing machine and the outer peripheral edge surface polishing machine, and hence many operators are required, and the cost is high.

(3) To improve the processing efficiency, polishing is carried out simultaneously on 100 or so glass disks stacked on top of one another using the inner peripheral edge surface polishing machine, and 30 or so glass disks stacked on top of one another using the outer peripheral edge surface polishing machine, and hence the major surfaces of the glass disks rub against one another and may become scratched.

(4) Even though the inner and outer peripheral edge surfaces of each glass disk are smoothed by chamfering and polishing in steps P3 to P5, fine cracks of depth, for example, 1 to 60 $\mu$m may remain, resulting in the strength of the glass dropping. Moreover, if there are cracks or the like on the inner and outer peripheral edge surfaces of the glass disk, then the strength will not increase sufficiently even if chemical strengthening treatment is carried out.

(5) Large-grained glass powder generated during the grinding in step P3 may adhere to the major surfaces of the glass disk, resulting in scratches.

(6) In step P5 in particular, uneven polishing may occur due to the rotating brush not contacting the stacked glass disks uniformly, resulting in the problem of the extent of polishing varying between the glass disks.

SUMMARY OF THE INVENTION

It is an object of the present invention to provide a method of manufacturing a glass substrate for information recording media that allows the inner and outer peripheral edge surfaces of the glass substrate for information recording media to be smoothed easily and inexpensively, a glass substrate for information recording media manufactured using this method, and an information recording medium using this glass substrate.

To attain the above object, the present invention provides a method of manufacturing a glass substrate for information recording media, comprising the steps of preparing a donut-shaped glass disk for information recording media having an outer peripheral edge surface and an inner peripheral edge surface, and smoothing at least one of the outer peripheral edge surface and the inner peripheral edge surface of the glass disk by melt-heating to a temperature at or above the softening point of the glass by irradiating with at least one laser beam. As a result, at least one of the outer peripheral edge surface and the inner peripheral edge surface of the glass disk becomes smooth and rounded, and hence a polishing step used in a conventional method can be omitted, and moreover chamfering in a grinding step can also be omitted.

Preferably, both the outer peripheral edge surface and the inner peripheral edge surface are melt-heated in the smoothing step. As a result, the working efficiency can be improved.

Also preferably, the at least one laser beam is a divergent beam. As a result, the at least one laser beam can be reliably prevented from being irradiated onto and thus melting the at least one major surface of the glass disk.

Also preferably, the ratio of the energy density of the laser beam on the outer peripheral edge surface to the energy density of the laser beam on the inner peripheral edge surface is in a range of 2 to 5. As a result, the energy density per unit area can be made approximately the same for the inner peripheral edge surface and the outer peripheral edge surface.

Also preferably, the mother glass of the glass disk is a silicate glass containing one compound selected from the group consisting of $Li_2O$ and $Na_2O$ as an alkaline oxide component, and chemical strengthening treatment is carried out wherein an alkaline component in a surface layer of the glass disk which has been subjected to the smoothing is replaced with an alkaline component having an ionic radius larger than the ionic radius of the alkaline oxide component. As a result, the strength of the glass disk can be increased.

To attain the above object, the present invention also provides a glass substrate for information recording media manufactured using the method according to the present invention as described above. As a result, a glass substrate wherein at least one of the inner peripheral edge surface and the outer peripheral edge surface is smooth can be obtained.

To attain the above object, the present invention also provides an information recording medium comprising the glass substrate for information recording media according to the present invention as described above with an information recording film formed on at least one major surface thereof. As a result, an information recording medium wherein foreign matter does not attach to the major surface(s) thereof can be obtained.

Also, according to the present invention, an information recording medium can be obtained by forming an information recording film such as a magnetic recording film, an optical magnetic recording film or an optical recording film on one or both major surfaces of the glass substrate for information recording media according to the present invention as described above.

Preferably, the information recording film is a magnetic recording film.

The above and other objects, features and advantages of the invention will become more apparent from the following detailed description taken in conjunction with the accompanying drawings.

BRIEF DESCRIPTION OF THE DRAWINGS

FIGS. 6A and 6B are views useful in explaining the roughness of a peripheral edge surface of a glass disk; specifically:

DETAILED DESCRIPTION OF PREFERRED EMBODIMENTS

Embodiments of the method of manufacturing a glass substrate for information recording media according to the present invention will now be described with reference to the drawings.

Figure 1:
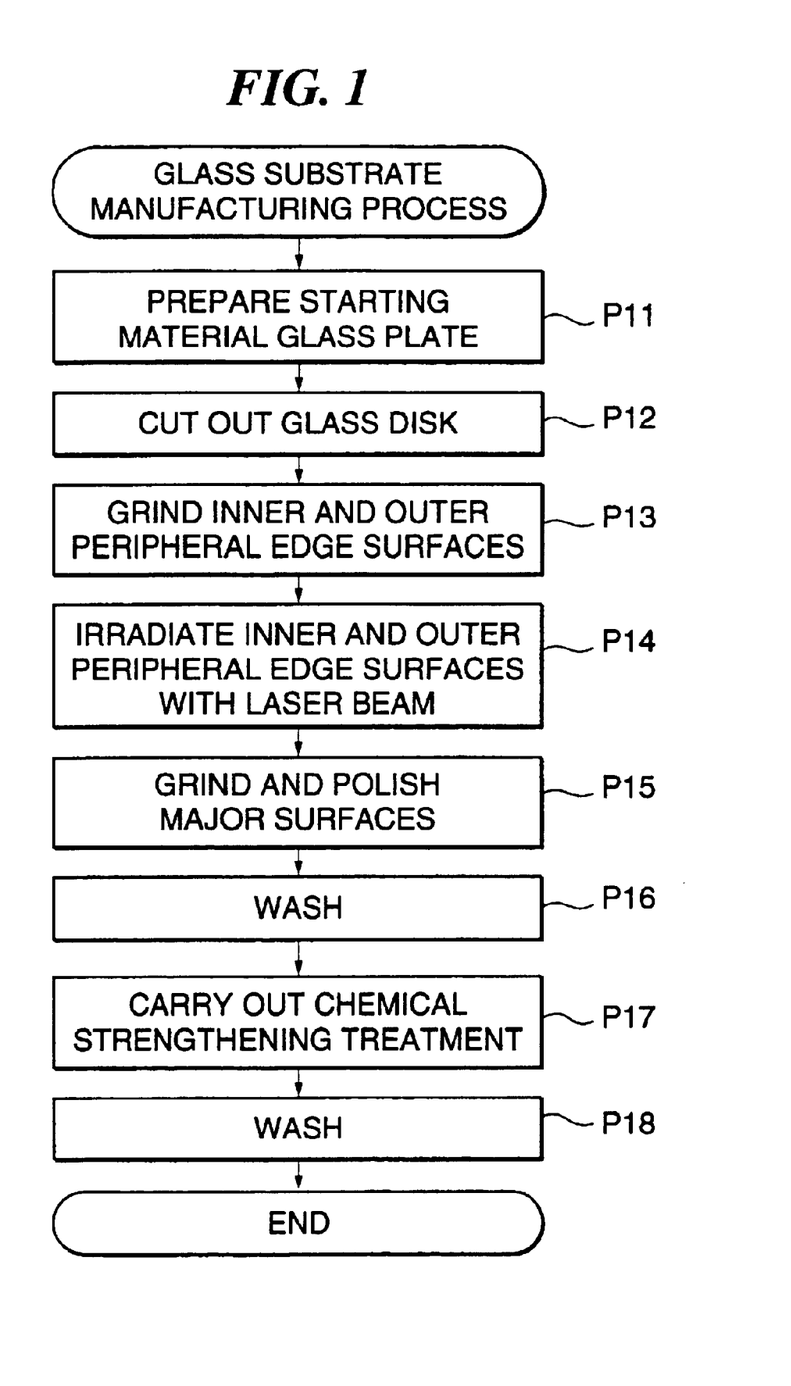
FIG. 1 is a flow chart of a manufacturing process for a glass substrate for information recording media according to an embodiment of the present invention.

FIG. 1 is a flow chart of a manufacturing process for a glass substrate for information recording media according to an embodiment of the present invention. Note that types of information recording medium include magnetic disks, optical magnetic disks and optical disks. However, in the present embodiment, a glass substrate for a magnetic disk, which is a donut-shaped disk having a hole in the center thereof and having opposite side surfaces thereof as major surfaces covered with a magnetic film as a data recording medium, is manufactured.

First, a starting material glass plate of thickness 1.0 mm is prepared (step P11). The mother glass of this starting material glass plate is preferably a silicate glass that is rigid and resistant to chemicals such as alkalis, a crystallized glass made by crystallizing a silicate glass through heat treatment, or the like.

Examples of the silicate glass include soda lime silicate glass which is used as window glass in building, aluminosilicate glass, borosilicate glass, and glass that can be easily chemically strengthened. The glass that can be easily chemically strengthened is a glass which is chemically strengthened by bringing the glass into contact with molten potassium nitrate to replace lithium ions and/or sodium ions in the glass with potassium ions, which have a larger ionic radius than lithium ions and sodium ions, or by bringing the glass into contact with molten sodium nitrate to replace lithium ions in the glass with sodium ions, which have a larger ionic radius than lithium ions, thus producing compressive stress in a surface layer (depth about 50 to 200 μm) of the glass. An example of this type of glass contains as principal components 60 to 65 mass % of $SiO_2$, 10 to 20 mass % of $Al_2O_3$, 0 to 5 mass % of MgO, 0 to 5 mass % of CaO, 2 to 10 mass % of $Li_2O$, and 5 to 15 mass % of $Na_2O$. Moreover, a crystallized glass has principal components selected from $SiO_2$, $Al_2O_3$, $Li_2O$, MgO, $P_2O_3$, ZrO, $CeO_2$, $TiO_2$, $Na_2O$ and $K_2O$.

There are no particular limitations on the composition of the crystallized glass, but a crystallized glass containing, for example, 70 to 80 mass % of $SiO_2$, 2 to 8 mass % of $Al_2O_3$, 1 to 7 mass % of $K_2O$, 5 to 15 mass % of $Li_2O$ and 1 to 5 mass % of $P_2O_5$ is preferable, as such a glass does not suffer heat fracture when irradiated with a laser beam, and hence edge surfaces thereof can be smoothed using step P14 described below.

The starting material glass plate is formed using a float glass manufacturing method, a down-draw manufacturing method, or the like.

A donut-shaped glass disk having an outside diameter of 84 mm and an inside diameter of 25 mm is cut out from the starting material glass plate (step P12). The method of doing this is to irradiate with a laser beam along the cutting lines to cause strain or insert the cutting lines using a wheel cutter, and then cut along the cutting lines. The cutting lines run along the outer periphery and the inner periphery of the glass disk; the outer cutting line is set 0.5 to 1.0 mm outside the outer periphery, and the inner cutting line 0.5 to 1.0 mm inside the inner periphery.

The next step is to grind the cut-out surfaces at the outer and inner peripheries of the glass disk, thus adjusting the outside and inside diameters (step P13). After the grinding, the average roughness Ra is, for example, 0.3 to 0.4 μm, and the maximum roughness Rmax, for example, 3 to 4 μm. The grinding is carried out on one glass disk at a time, and is comprised of first stage grinding using a diamond grindstone of #324 roughness (coarse), and second stage grinding using a diamond grindstone of #500 roughness (fine).

Next, edge surface smoothing is carried out by irradiating a laser beam onto each of the inner peripheral edge surface and the outer peripheral edge surface of the glass disk using a laser beam irradiation apparatus, described below, thus heating the inner peripheral edge surface and the outer peripheral edge surface of the glass disk to a temperature at or above the softening point of the glass, for example 750° C. or more, preferably about 1000° C., and hence melting or making fluid projecting parts of the inner and outer peripheral edge surfaces of the glass disk and thus smoothing the inner and outer peripheral edge surfaces (step P14). As a result, compressed layers can be formed on the inner and outer peripheral edge surfaces without scratches or fine cracks appearing. The mechanical strength of the glass disk can thus be increased.

The major surfaces (information recording surfaces) of the glass disk that will be covered with information recording films are then ground using diamond grindstones and precision polished using a cerium oxide suspension, thus making the thickness of the glass disk a predetermined value and smoothing the surfaces (step P15). Washing is then carried out to remove abrasive grains used in the polishing and the like (step P16).

Next, the glass disk is further strengthened using chemical strengthening treatment, so that the strength will be sufficient when the glass disk is rotated at high speed during use as an information recording medium (step P17). In the chemical strengthening treatment, to strengthen the glass disk, alkaline metal ions in a surface layer of the glass disk are replaced with alkaline metal ions having a larger ionic radius, thus forming a compressed layer. Specifically, the chemical strengthening treatment is carried out by immersing the glass disk in a molten salt at 400 to 450° C. for 2 to 5 hours. If the molten salt is potassium nitrate ($KNO_3$), then lithium ions and sodium ions in the surface layer of the glass disk are replaced with potassium ions, whereas if the molten salt is sodium nitrate ($NaNO_3$), then lithium ions in the surface layer of the glass disk are replaced with sodium ions.

Finally, the glass disk that has been subjected to the chemical strengthening treatment is washed using warm water, alkaline washing water or pure water, thus removing salt from the chemical strengthening treatment, foreign matter and the like attached to the glass disk (step P18).

Figure 2:
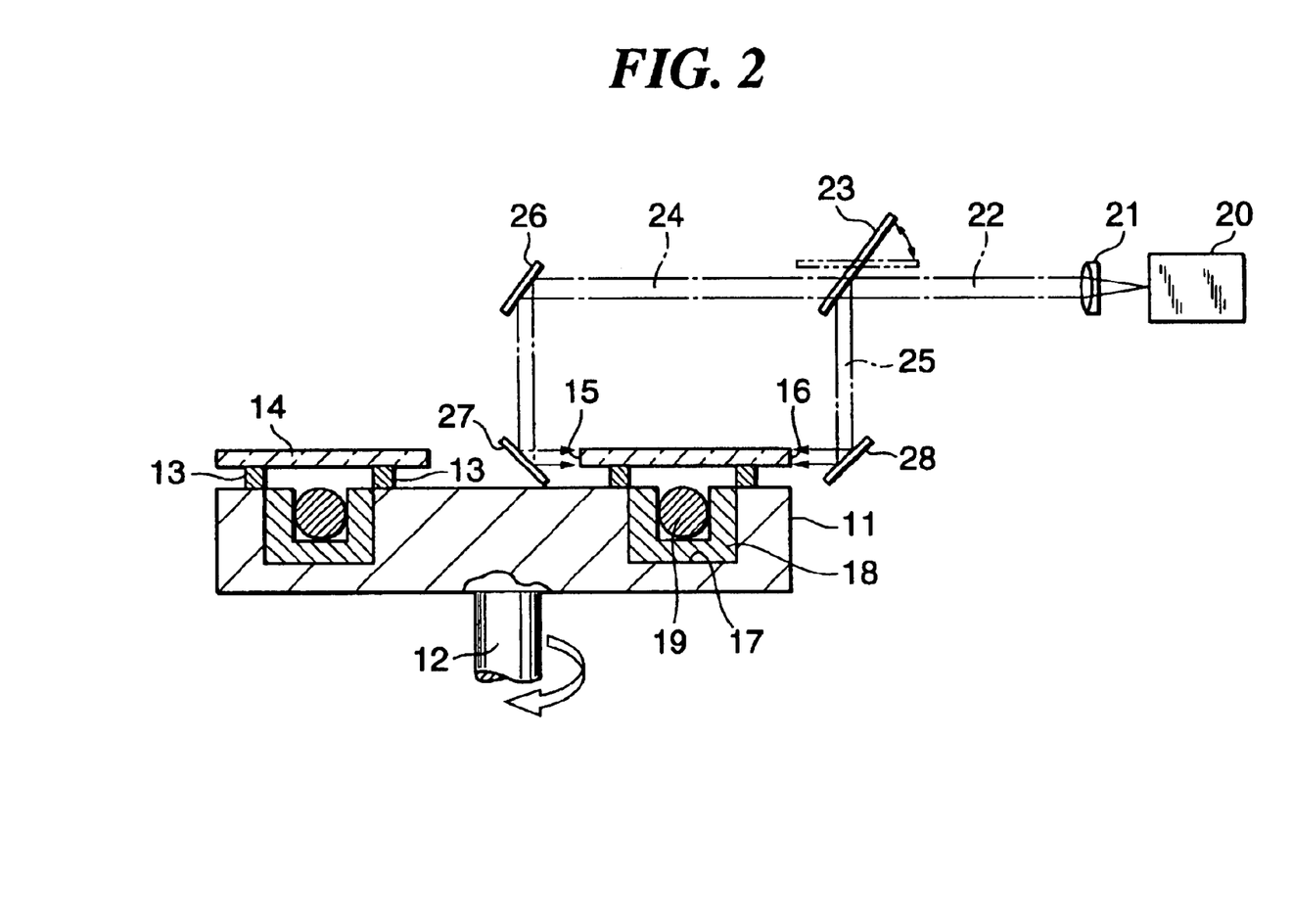
FIG. 2 is a partially sectional view of an example of a laser beam irradiation apparatus used in step P14 shown in FIG. 1.

FIG. 2 is a partially sectional view of an example of the laser beam irradiation apparatus used in step P14 shown in FIG. 1.

In FIG. 2, a disk-shaped horizontal worktable 11 is connected to a vertical shaft 12, and is rotated about the vertical shaft 12 by a motor, not shown. A glass disk 14 for making a magnetic disk is placed on an upper surface of the worktable 11 via two annular seats 13, and thus rotates with the worktable 11. The glass disk 14 has been cut out from a starting material glass plate and inner and outer peripheral edge surfaces 15 and 16 thereof have been ground in steps P11 to P13 described above.

An annular groove 17 is formed in the upper surface of the worktable 11 in concentricity with the worktable 11. A thermal insulating material 18 is fitted in the groove 17 and disposed along side walls and a bottom wall thereof, and an electrical heater 19 is inserted into the groove 17 for preheating the glass disk 14.

The laser beam irradiation apparatus has a single laser oscillator 20. The laser oscillator 20 emits a laser beam in a horizontal direction, and the emitted laser beam is made into a parallel laser beam 22 by a collimator 21. The laser beam 22 is then alternately switched between a horizontal laser beam 24 and a vertical laser beam 25 by means of a galvano-scan mirror 23. The laser beam 24 is irradiated via two stationary mirrors 26 and 27 onto the inner peripheral edge surface 15 of the glass disk 14, and the laser beam 25 is irradiated via one stationary mirror 28 onto the outer peripheral edge surface 16 of the glass disk 14.

In the laser beam irradiation apparatus of FIG. 2, the speed of rotation of the worktable 11 is set such that the circumferential speed at the inner peripheral edge surface 15 of the glass disk 14 is 0.02 to 5.0 m/minute.

The laser oscillator 20 may be, for example, a YAG laser or a carbon dioxide laser, but a carbon dioxide laser is particularly preferable from the standpoint of the absorption coefficient.

The dominant wavelength of the laser beam emitted from the laser oscillator 20 is preferably 250 to 20,000 nm, more preferably 900 to 12,000 nm.

If the energy densities of the laser beams 24 and 25 are too low, then the temperature of the glass will not be raised sufficiently, but it is pointless to make these energy densities too high since this will not result in any further increase in the melting rate of the glass surfaces. The energy densities of the laser beams 24 and 25 are thus preferably in a range of 1 to 20W/mm², more preferably 1 to 10W/mm².

The powers of the laser beams 24 and 25 are thus preferably in a range of 0.7 to 100W. Moreover, the ratio of the energy density of the laser beam 25 to the energy density of the laser beam 24 is preferably more than 1, and more preferably equal to the ratio of the outside diameter of the glass disk to the inside diameter thereof. As a result, the laser beam irradiation dose per unit length of the inner/outer peripheral edge surface of the glass disk will be the same for the inner and outer peripheral edge surfaces. Specifically, Table 1 shows the ratio of the outside diameter to the inside diameter for various nominal magnetic disk sizes, and it can be seen from Table 1 that this ratio is in a range of 2.8 to 4.0; the above energy density ratio is thus preferably in a range of 2 to 5.

TABLE 1

| Nominal size of glass substrate for recording media | 1" | 1.8" | 1.8" | 2.5" | 3" | 3.5" |
|---|---|---|---|---|---|---|
| Outside diameter (mm φ) | 27 | 48 | 48 | 65 | 84 | 95 |
| Inside diameter (mm φ) | 7 | 12 | 17 | 20 | 25 | 25 |
| Ratio (Outside diameter/Inside diameter) | 3.9 | 4.0 | 2.8 | 3.3 | 3.4 | 3.8 |

An energy density ratio as described above can be realized by adjusting the time for which the galvano-scan mirror 23 is stopped in each position.

Figure 3:
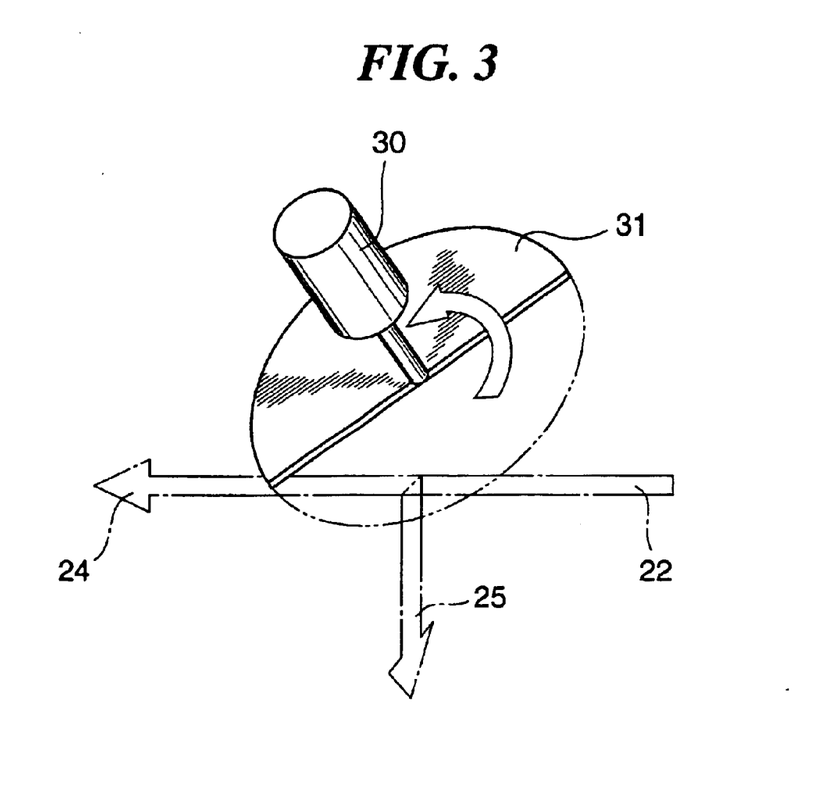
FIG. 3 is a perspective view of a semicircular plate-shaped rotating mirror in the laser beam irradiation apparatus shown in FIG. 2.

In the laser beam irradiation apparatus constructed as above, the laser beam 22 may be alternately switched between the laser beam 24 irradiated onto the inner peripheral edge surface 15 of the glass disk 14 and the laser beam 25 irradiated onto the outer peripheral edge surface 16 of the glass disk 14 using a semicircular plate-shaped mirror (chopper) 31 rotated by a motor 30 as shown in FIG. 3 instead of the galvano-scan mirror 23. Another alternative may be to split the laser beam 22 into two laser beams 24 and 25 using a stationary half mirror, not shown in the drawings, whereby the laser beam 24 can be irradiated onto the inner peripheral edge surface 15 of the glass disk 14 and the laser beam 25 onto the outer peripheral edge surface 16 of the glass disk 14 simultaneously. In this case, the ratio of the power of the laser beam 25 to the power of the laser beam 24 can be changed by changing the reflectance of the half mirror.

Figure 4:
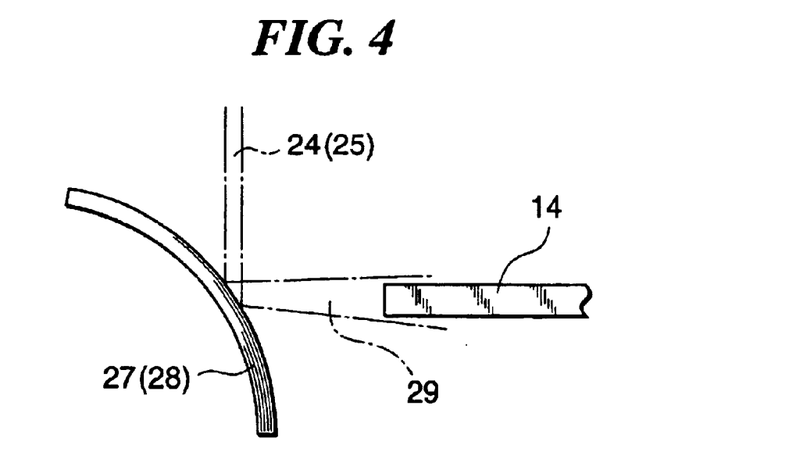
FIG. 4 is a view useful in explaining a mirror in the laser beam irradiation apparatus shown in FIG. 2.

Moreover, the mirrors 27 and 28 are preferably convex as shown in FIG. 4. As a result, the laser beams 24 and 25 irradiated onto the inner and outer peripheral edge surfaces 15 and 16 respectively of the glass disk 14 can each be made into a divergent beam 29, and hence the laser beams 24 and 25 can be reliably prevented from being irradiated onto and thus melting the major surfaces of the glass disk 14. The angle of opening of the divergent beam is preferably 1 to 3 degrees. It goes without saying that the laser beams 24 and 25 may also be made divergent by not completely parallelizing the laser beam using the collimator 21, instead of using convex mirrors 27 and 28.

Figure 5:
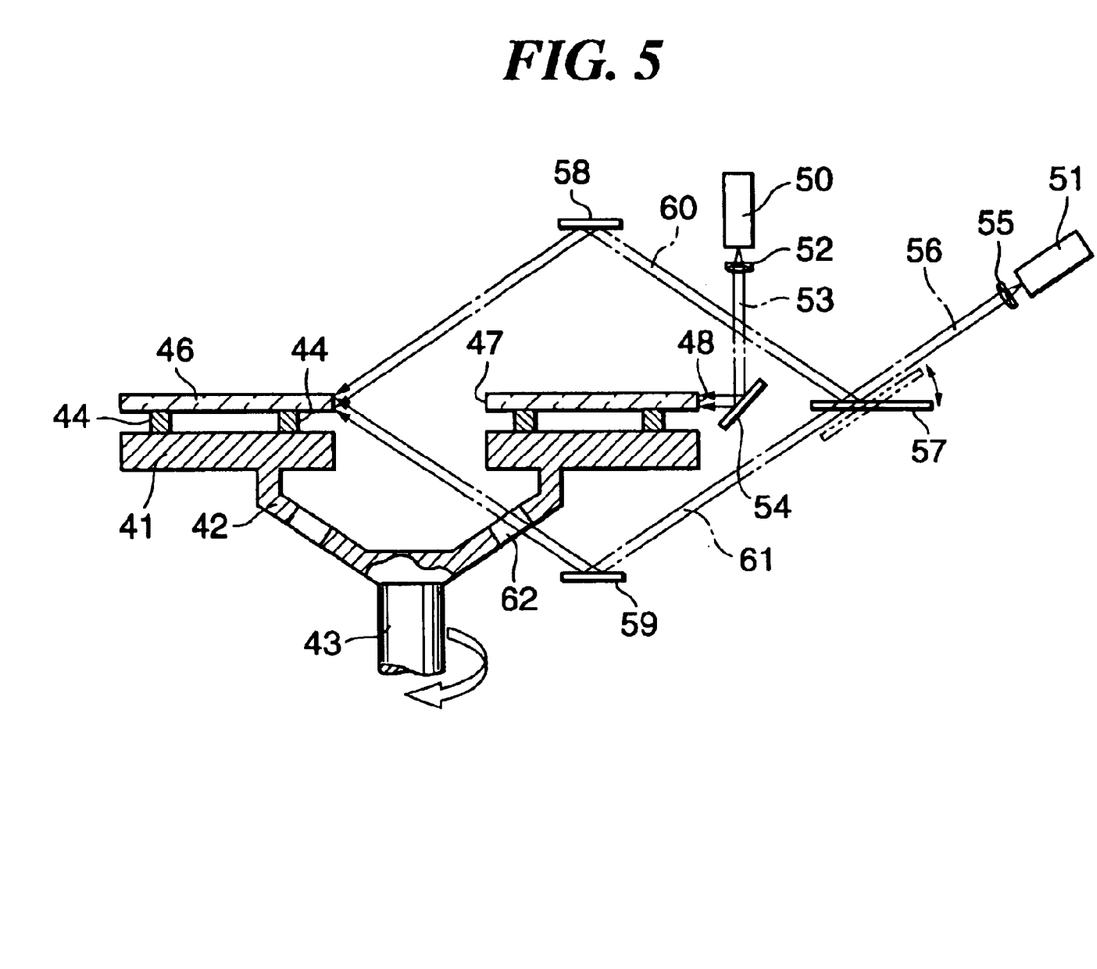
FIG. 5 is a partially sectional view of a modified example of the laser beam irradiation apparatus used in step P14 shown in FIG. 1.

FIG. 5 is a partially sectional view of a modified example of the laser beam irradiation apparatus used in step P14 shown in FIG. 1.

In FIG. 5, a donut-shaped horizontal worktable 41 is connected to a vertical shaft 43 via a cap-shaped connecting portion 42, and is rotated about the vertical shaft 43 by a motor, not shown. A glass disk 46 for making a magnetic disk is placed on an upper surface of the worktable 41 via two annular seats 44, and thus rotates with the worktable 41.

The glass disk 46 has been manufactured in the same way as the glass disk 14 shown in FIG. 2, and has an inner peripheral edge surface 47 and an outer peripheral edge surface 48. Moreover, a heater for preheating the glass disk 46 is provided along with a thermal insulating material in a groove in the upper surface of the worktable 41 as in the case of the worktable 11 shown in FIG. 2, but these items have been omitted from FIG. 5.

The laser beam irradiation apparatus has a laser oscillator 50 for the outer peripheral edge surface 48 of the glass disk 46 and a laser oscillator 51 for the inner peripheral edge surface 47 of the glass disk 46. The laser beam emitted from the laser oscillator 50 is made into a parallel laser beam 53 by a collimator 52, and the laser beam 53 is then irradiated onto the outer peripheral edge surface 48 of the glass disk 46 via a mirror 54. The laser beam emitted from the laser oscillator 51, on the other hand, is made into a parallel laser beam 56 by a collimator 55, and then the laser beam 56 is alternately switched between traveling above and traveling below the glass disk 46 by means of a galvano-scan mirror 57 disposed at the same height as the glass disk 46. The resulting laser beams 60 and 61 are irradiated alternately onto the inner peripheral edge surface 47 of the glass disk 46 via mirrors 58 and 59 respectively. This results in laser beam irradiation being uniformly carried out over the inner peripheral edge surface 47. The connecting portion 42 has suitable openings 62 provided therein such that the laser beam 61 is not obstructed. The positions of the openings 62 can be calculated and set in accordance with the relationship between the speed of operation of the galvano-scan mirror 57 and the speed of rotation of the worktable 41.

In the laser beam irradiation apparatus constructed as above, a semicircular plate-shaped mirror rotated by a motor or a stationary half mirror may be used instead of the galvano-scan mirror 57, as with the laser beam irradiation apparatus of FIG. 2. Moreover, it goes without saying that the setting of the ratio of the energy density of the laser beam 61 to the energy density of the laser beam 60, the possibility of making the mirrors 54, 58 and 59 convex, and so on are as was described in the case of the laser beam irradiation apparatus of FIG. 2.

In the embodiments described above, the inner and outer peripheral edge surfaces of the glass disk 14 (or 46) were both irradiated with a laser beam, but only one of the inner and outer peripheral edge surfaces may be irradiated with a laser beam.

Moreover, in the embodiments described above, the size of the glass disk 14 (or 46) was an outside diameter of 84 mm, an inside diameter of 25 mm, and a thickness of 1.0 mm. However, it goes without saying that the outside diameter, the inside diameter and the thickness may take any values.

Figure 6A:
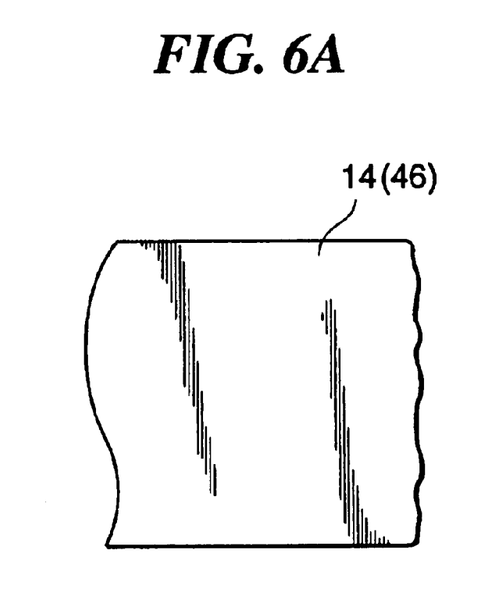
FIG. 6A shows the peripheral edge surface just before the laser beam irradiation of step P14.
Figure 6B:
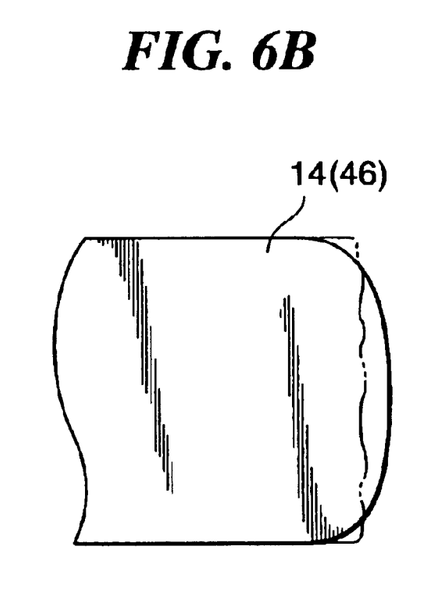
FIG. 6B shows the peripheral edge surface after the laser beam irradiation of step P14.

According to the manufacturing process of FIG. 1, roughness in an amount corresponding to the diamond grindstones remains on the inner and outer peripheral edge surfaces 15 (or 47) and 16 (or 48) of the glass disk 14 (or 46) immediately before the laser beam irradiation of step P14 as shown in FIG. 6A, but the inner and outer peripheral edge surfaces 15 (or 47) and 16 (or 48) of the glass disk 14 (or 46) immediately after the laser beam irradiation of step P14 are smooth and edge portions adjoining the major surfaces are rounded as shown in FIG. 6B. That is, by carrying out the laser beam irradiation (step P14) on the inner and outer peripheral edge surfaces to smooth these edge surfaces, polishing of the inner and outer peripheral edge surfaces (steps P4 and P5 in FIG. 9) which is conventionally carried out to smooth these edge surfaces can be omitted, and moreover chamfering (step P3 in FIG. 9) which is conventionally carried out just before the smoothing of the edge surfaces can also be omitted.

According to the present invention, the smoothing (step P14) of the inner and outer peripheral edge surfaces is carried out by melting or making fluid projecting parts of the inner and outer peripheral edge surfaces of the glass disk through laser beam irradiation. It is thought that melting and flowing of the glass in recessed parts of the inner and outer peripheral edge surfaces also occurs at the same time. The projecting parts of the inner and outer peripheral edge surfaces thus flow into the recessed parts, and hence the surface is smoothed rapidly. Moreover, the smoothing is carried out in a dry state with only a laser beam coming into contact with the glass disk and without abrasive grains or fine metal oxide particles such as cerium oxide particles being used, and hence the glass is not soiled and foreign matter does not become attached to the glass. Furthermore, by focusing the laser beam energy onto the inner and outer peripheral edge surfaces of the glass disk, the smoothing can be carried out in a short time.

In contrast, in the case of the smoothing carried out conventionally on the inner and outer peripheral edge surfaces of a glass disk by chamfering and polishing (steps P3 to P5 in FIG. 9), projecting parts are ground down progressively from the top, and hence the polishing must be carried out until the ground surface reaches the bottom of the recessed parts. To do this while insuring adequate industrial productivity, coarse abrasive grains which give a high grinding rate may be used, but then there is a limit to how smooth the surface can be made. To achieve a good balance between the grinding rate and the degree of smoothing, usually a plurality of stages of grinding are carried out, each with a different size of abrasive grains, but this results in problems such as the equipment cost being high due to a plurality of pieces of equipment being required and the processing taking a long time. A characteristic of the smoothing according to the present invention is that these drawbacks suffered by the conventional art are not present.

A description will now be given of examples of the present invention.

In these examples, the undermentioned experiments were carried out with regard to the samples shown in Table 2.

EXAMPLE 1

Samples of a glass substrate for a magnetic disk of outside diameter 84 mm, inside diameter 25 mm and thickness 0.8 mm were prepared through step 1 to step 8 in that order as described below.

Step 1) Preparation of Starting Material Glass Plate

A starting material glass plate was prepared by forming an aluminosilicate glass having 63.3 mass % of $SiO_2$, 16.3 mass % of $Al_2O_3$, 0.4 mass % of $K_2O$, 1.9 mass % of MgO, 3.8 mass % of CaO, 3.7 mass % of $Li_2O_3$ and 10.6 mass % of $Na_2O$ as principal components into a plate shape using a float glass manufacturing method.

Step 2) Cutting out of Glass Disks 500 glass disks were produced by inserting cutting lines into a surface of the starting material glass plate at a position slightly outside the above-mentioned outside diameter and a position slightly inside the above-mentioned inside diameter using a diamond cutter, and cutting out along the cutting lines by applying an external force.

Step 3) Grinding and Polishing of Inner and Outer Peripheral Edge Surfaces

Step 3A) First Stage Grinding of Inner and Outer Peripheral Edge Surfaces

Each glass disk was fixed in a fixing jig, rotating grindstones having #324 roughness diamond abrasive grains attached thereto were pushed against the edge surfaces of the glass disk, and grinding was carried out until the inside diameter and the outside diameter became the predetermined values.

Step 3B) Second Stage Grinding of Inner and Outer Peripheral Edge Surfaces

Each glass disk was fixed in a fixing jig, rotating grindstones having #500 roughness diamond abrasive grains attached thereto were pushed against the edge surfaces of the glass disk, and the roughness of the edge surfaces was reduced. Afterwards, the glass disk was washed with water.

Step 3C) Precision Polishing of Inner and Outer Peripheral Edge Surfaces 100 of the glass disks for which the inner peripheral edge surface and the outer peripheral edge surface had been

TABLE 2

Figure 7:
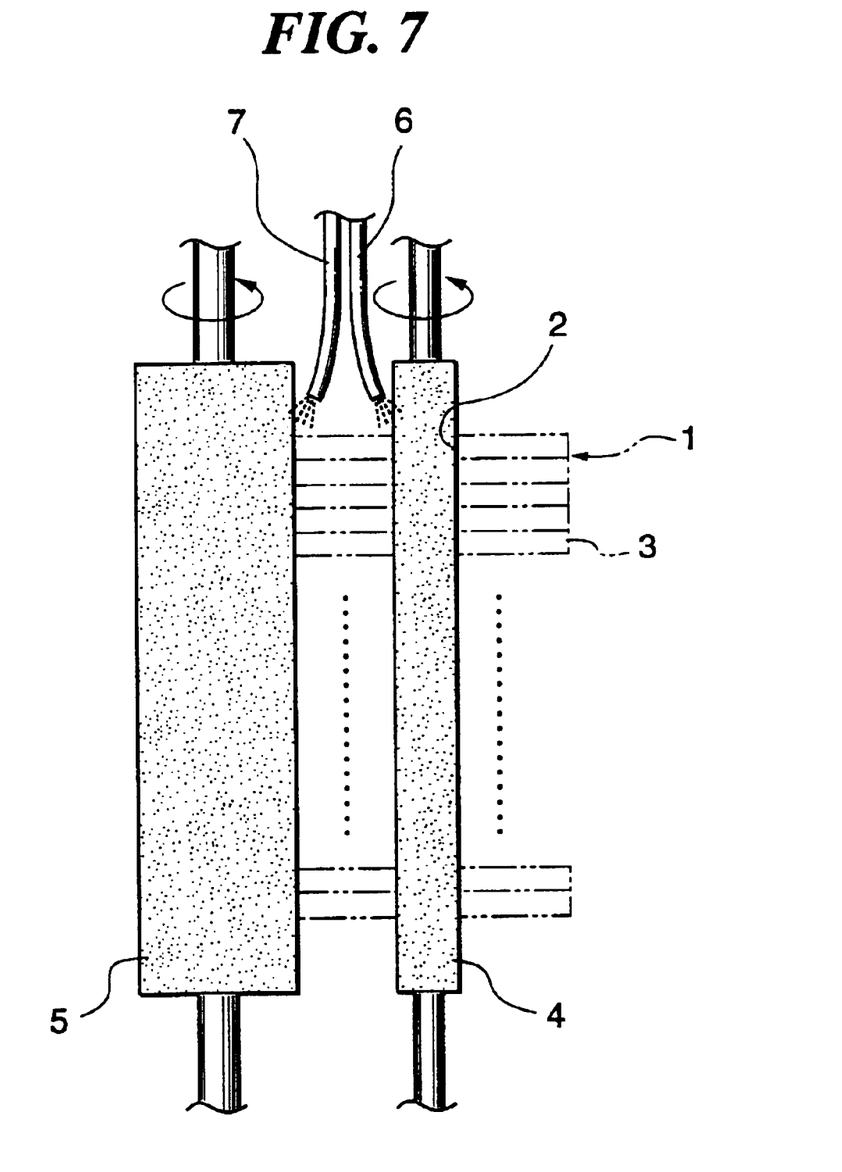
FIG. 7 is a schematic view useful in explaining a precision polishing apparatus for polishing the inner and outer peripheral edge surfaces of stacked glass disks, as used in step 3C in Example 1.

| | | | Glass disk edge surface smoothing steps | | | | | | |
|---|---|---|---|---|---|---|---|---|---|
| | | | Wet processing steps carried out | | | Dry processing | Roughness of inner and outer peripheral edge surfaces | | |
| | | | First stage | Second stage | | steps | | | |
| | | Type of glass | grinding using #324 roughness diamond abrasive grains | grinding using #500 roughness diamond abrasive grains | Precision polishing using suspension of cerium oxide fine powder | carried out Smoothing by laser beam irradiation | Average roughness Ra (μm) | Maximum roughness Rmax (μm) | Δ Ra   Δ Rmax |
| Example | 1 | Aluminosilicate glass | Yes | Yes | Yes | Yes | 0.03~0.06 | 0.2~0.5 | 0.03   0.3 |
| | 2 | Aluminosilicate glass | Yes | Yes | — | Yes | 0.03~0.07 | 0.2~0.5 | 0.04   0.3 |
| | 3 | Aluminosilicate glass | Yes | — | — | Yes | 0.06~0.10 | 0.4~0.7 | 0.04   0.3 |
| | 4 | Crystallized glass | Yes | Yes | — | Yes | 0.03~0.04 | 0.2~0.3 | 0.01   0.1 |
| Comparative example | 1 | Aluminosilicate glass | Yes | Yes | — | — | 0.6~1.3 | 2.5~5.0 | 0.7   2.5 |
| | 2 | Aluminosilicate glass | Yes | Yes | Yes | — | 0.05~0.4 | 0.3~2.5 | 0.35   2.2 | ground as above were stacked on top of one another and fixed, and, as shown in FIG. 7, precision polishing of the inner and outer peripheral edge surfaces was carried out by pushing cylindrical rotating brushes 4 and 5 made of a resin against the inner peripheral edge surfaces 2 and the outer peripheral edge surfaces 3 of the stacked glass disks 1 and feeding in a suspension containing cerium oxide fine powder from supply pipes 6 and 7. Afterwards, the glass disks were again washed with water.

Step 4) Laser Beam Irradiation of Inner and Outer Peripheral Edge Surfaces.

Next, the glass disks for which the inner peripheral edge surface and the outer peripheral edge surface had been precision polished were taken one at a time, and the edge surfaces were smoothed by laser beam irradiation. The laser beam irradiation apparatus shown in FIG. 2 was used, and the smoothing processing conditions were as follows:

(1) Laser oscillator: Carbon dioxide laser (maximum rating 40W)

(2) Diameter of irradiated laser beam: Circle of diameter 3 mm (3) Laser power density: 4W/mm$^2$ (4) Laser beam irradiation method: Scan once across each part of edge surface (adjust to divergent beam using lens)

(5) Speed of rotation of glass disk at outer periphery: 0.5 m/minute (6) Heating of glass: Central part in radial direction heated to about 200° C. using nichrome electrical heater Step 5) Grinding and Polishing of Major Surfaces (Information Recording Surfaces)

Glass disks which had been subjected to the laser beam irradiation were set into a resin carrier having a plurality of holes each having an inside diameter slightly larger than the outside diameter of the glass disks, an upper plate and a lower plate each having #500 roughness diamond abrasive grains attached thereto were pushed against the top and bottom respectively of the glass disks, thus sandwiching the glass disks in-between, and the plates were rotated, thus carrying out wet grinding of the major surfaces of the glass disks. Furthermore, precision polishing of the major surfaces of the glass disks was carried out by using a polishing machine having plates with resin pads attached thereto instead of the diamond abrasive grains, and feeding in #1000 roughness cerium oxide fine powder onto the major surfaces of the glass disks.

Step 6) Washing

The glass disks were next washed with water to remove polishing abrasive grains and the like.

Step 7) Chemical Strengthening Treatment

Chemical strengthening treatment was then carried out by immersing the glass disks for 3 hours in a molten salt of potassium nitrate heated to 450° C., thus replacing lithium ions and sodium ions in the surface layer of each glass disk with potassium ions, and hence forming a compressed layer.

Step 8) Washing

Finally, the glass disks soiled with the molten salt were washed with water.

The roughnesses of the inner and outer peripheral edge surfaces of the 500 samples of glass substrates for magnetic disks prepared using the method of Example 1 were recorded onto a chart using a stylus type roughness meter, and the average roughness Ra and the maximum roughness Rmax were calculated in accordance with a JIS-stipulated method. The results are shown in the "Example 1" row in Table 2.

The average roughness Ra of the samples prepared using the method of Example 1 was low at 0.03 to 0.06 μm, and moreover the range over which the Ra value varies was also small. The average roughness Ra obtained thus did not exceed 0.1 μm, which is the value required for the glass disk to be suitable for use as a magnetic disk for high-density recording using a magneto-resistive head (an MR head or a GMR head). Furthermore, the maximum roughness Rmax was 0.2 to 0.5 μm, and hence the maximum value of Rmax did not exceed 1 μm, which is the value required for use in high-density recording.

A glass substrate for a magnetic disk is manufactured through a plurality of processing steps, and usually washing with water, alkaline water, acidic water, washing water or the like is carried out after each step. However, even by washing it is not easy to completely remove foreign matter (glass waste that arises through grinding and polishing, residual abrasive grains, dust from the air, metal powder worn off from machinery, etc.) attached to the edge surfaces of the glass substrate, especially in recessed parts. When the glass substrate is used as an information recording medium in a hard disk drive and rotated at high speed, there is a high probability of such attached matter flying off the surface of the information recording medium due to centrifugal force and attaching to the information recording surface. This results in an increased risk of magnetic head crashes.

To reduce this risk, in general the washing is carried out thoroughly, and also roughness consisting of projecting and recessed parts on the edge surfaces of the glass substrate is reduced so that washing will be easier and foreign matter will be less likely to become attached. As shown in Table 2, in the case of the samples prepared using the method of Example 1, the average roughness Ra is 0.06 μm or less and the maximum roughness Rmax is 0.5 μm or less, showing that the edge surfaces have been processed well.

EXAMPLE 2

500 samples of glass substrates for information recording media were prepared using the same method as in Example 1, but only the precision polishing of step 3C described above was not carried out. As shown in Table 2, the ranges of the average roughness Ra and the maximum roughness Rmax for the samples prepared using the method of Example 2 were about the same as for the samples prepared using the method of Example 1.

EXAMPLE 3

500 samples of glass substrates for information recording media were prepared using the same method as in Example 1, but only the second stage grinding of step 3B and the precision polishing of step 3C described above were not carried out. As shown in Table 2, the ranges of the average roughness Ra and the maximum roughness Rmax for the samples prepared using the method of Example 3 were shifted to slightly higher values compared with these ranges for the samples prepared using the method of Example 1, but were still satisfactory.

EXAMPLE 4

500 samples of glass substrates for information recording media were prepared using the same method as in Example 2, but only a crystallized glass (75 mass % $SiO_2$, 3 mass % $Al_2O_3$, 4 mass % $K_2O$, 12mass % $Li_2O$, 2 mass % MgO, 3 mass % $P_2O_5$, 1 mass % ZnO) was used instead of the amorphous aluminosilicate glass as used in Example 1. As shown in Table 2, the ranges of the average roughness Ra and the maximum roughness Rmax for the samples prepared using the method of Example 4 were about the same as for the samples prepared using the method of Example 2.

Comparative Example 1

500 samples of glass substrates for information recording media were prepared using the same method as in Example 1, but only the precision polishing of step 3C and the laser beam irradiation of step 4 were not carried out. The range of the average roughness Ra of the samples prepared using the method of Comparative Example 1 was 0.6 to 1.3 µm, showing that the edge surfaces obtained had a roughness about 10 times greater than in Examples 1 to 4. Moreover, regarding the maximum roughness Rmax, some samples were obtained with a low value of Rmax of 2.5 µm, but there were also samples for which Rmax was high at 5 µm. The presence of samples for which Rmax is high means that there is a high possibility of there being glass substrates for information recording media within a production lot for which the possibility of attachment of foreign matter as described above is high, and hence a fear arises that it may not be possible to produce information recording media with high reliability.

Comparative Example 2

With an aim of making the average roughness Ra and the maximum roughness Rmax lower than for the samples prepared using the method of Comparative Example 1, 500 samples of glass substrates for information recording media were prepared using the same method as in Comparative Example 1, but only the precision polishing of step 3C was added to the wet processing steps; this precision polishing was carried out after the first stage grinding of step 3A and the second stage grinding of step 3B. As shown in Table 2, the average roughness Ra of the samples prepared using the method of Comparative Example 2 was lower than for Comparative Example 1. However, even though some samples were obtained with a low value of Ra of 0.05 µm, there were some samples with a value of Ra of 0.4 µm, and hence the value of the average roughness Ra varied over a broad range covering a factor of about 10 as compared with the samples prepared using the method of Example 1. Moreover, regarding the maximum roughness Rmax, there were some samples having a high value of 2.5 µm.

From the above, it can be seen that in the case of the samples prepared using the methods of Examples 1 to 4, the values of the average roughness Ra and the maximum roughness Rmax are distributed over a narrow range, but in the case of the samples prepared using the methods of Comparative Examples 1 and 2, the values of the average roughness Ra and the maximum roughness Rmax are distributed over a broad range.

Moreover, it can be seen that even in the case of the samples prepared using the method of Example 3 in which the only wet processing step carried out is first stage grinding to adjust the inside and outside diameters to predetermined values, it is possible to obtain low values and narrow distributions of the average roughness Ra and the maximum roughness Rmax. It can thus be seen that it is possible to reduce the number of processing steps.

Figure 8:
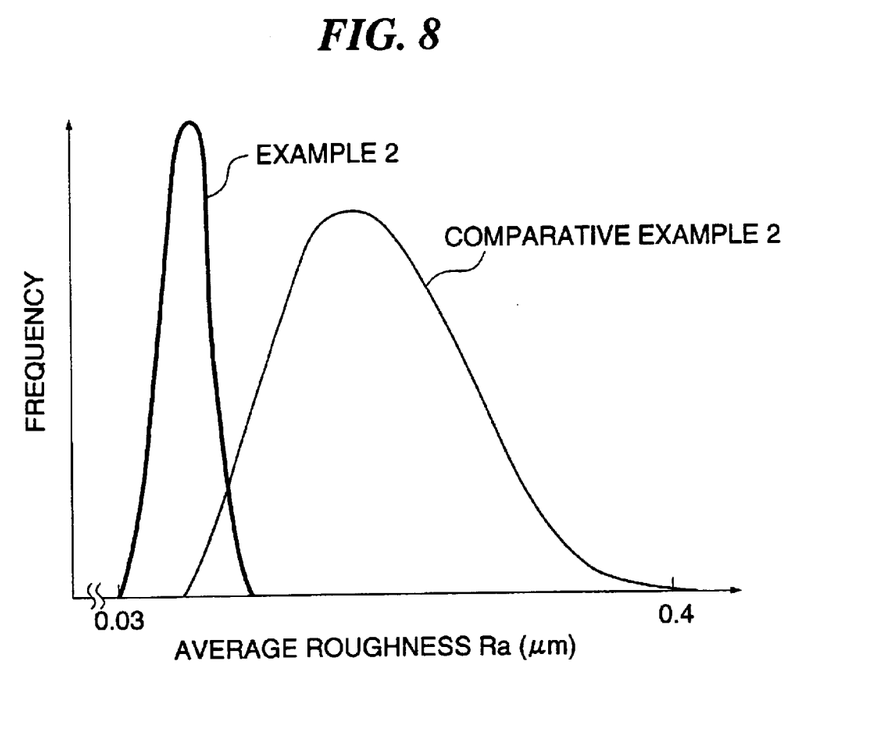
FIG. 8 is a graph showing the frequency distribution over 500 samples of the average roughness Ra obtained in Example 2 and Comparative Example 2.

FIG. 8 is a graph showing the frequency distribution of the average roughness Ra over 500 samples prepared using the method of Example 2 and 500 samples prepared using the method of Comparative Example 2. The average roughness Ra has a narrow distribution in the case of the samples prepared using the method of Example 2, but a distribution about 8 times as broad in the case of the samples prepared using the method of Comparative Example 2. If hard disk drives were manufactured using glass substrates for magnetic disks having a roughness distribution such as that of the samples prepared using the method of Comparative Example 2, then because the roughness is high, one would anticipate that the probability of the problems described earlier occurring would be increased.

What is claimed is:

1. A method of manufacturing a glass substrate for information recording media, comprising the steps of:
    preparing a glass disk for information recording media having an outer peripheral edge surface and an inner peripheral edge surface; and
    smoothing at least one of the outer peripheral edge surface and the inner peripheral edge surface of the glass disk by melt-heating to a temperature at or above a softening point of the glass by irradiating with at least one laser beam.

2. A method as claimed in claim 1, further comprising the step of processing the glass disk into a circular shape before carrying out the smoothing step.

3. A method as claimed in claim 2, further comprising the step of grinding, using at least one grindstone, the outer peripheral edge surface and the inner peripheral edge surface of the glass disk that has been processed into a circular shape.

4. A method as claimed in claim 3, further comprising the step of chamfering the outer peripheral edge surface and the inner peripheral edge surface into a predetermined shape after the grinding step.

5. A method as claimed in claim 1, further comprising grinding and polishing at least one major surface of the glass disk after the smoothing step.

6. A method as claimed in claim 5, wherein a mother glass of the glass disk is a silicate glass containing one compound selected from the group consisting of $Li_2O$ and $Na_2O$ as an alkaline oxide component, and the method further comprises the step of carrying out a chemical strengthening treatment wherein an alkaline metal ions of the alkaline oxide component in a surface layer of the glass disk is replaced with alkaline metal ions having a larger ionic radius, after the grinding and polishing of the at least one major surface of the glass disk have been carried out.

7. A glass substrate for information recording media prepared using the method claimed in claim 1.

8. A glass substrate for information recording media as claimed in claim 7, wherein an average roughness Ra of at least one of the inner peripheral edge surface and the outer peripheral edge surface is in a range of 0.001 to 0.3 µm.

9. A glass substrate for information recording media as claimed in claim 7, wherein a maximum roughness Rmax of at least one of the inner peripheral edge surface and the outer peripheral edge surface is in a range of 0.01 to 2 µm.

10. An information recording medium comprising a glass substrate for information recording media as claimed in claim 7 with an information recording film formed on at least one major surface thereof.

11. An information recording medium comprising a glass substrate for information recording media as claimed in claim 7, wherein said glass substrate has information recording film selected from the group consisting of a magnetic recording film, an optical magnetic recording film, and an optical recording film, which is formed on at least one major surface thereof.

12. An information recording medium as claimed in claim 10, wherein the information recording film is a magnetic recording film.

13. An information recording medium comprising a glass substrate for information recording media as claimed in claim 8 with an information recording film formed on at least one major surface thereof.

14. An information recording medium comprising a glass substrate for information recording media as claimed in claim 9 with an information recording film formed on at least one major surface thereof.

15. An information recording medium comprising a glass substrate for information recording media as claimed in claim 8, wherein said glass substrate has an information recording film selected from the group consisting of a magnetic recording film, an optical magnetic recording film, and an optical recording film, which is formed on at least one major surface thereof.

16. An information recording medium comprising a glass substrate for information recording media as claimed in claim 9, wherein said glass substrate has an information recording film selected from the group consisting of a magnetic recording film, an optical magnetic recording film, and an optical recording film, which is formed on at least one major surface thereof.

17. An information recording medium as claimed in claim 13, wherein the information recording film is a magnetic recording film.

18. An information recording medium as claimed in claim 14, wherein the information recording film is a magnetic recording film.

19. A method of manufacturing a glass-substrate for information recording media, comprising the steps of:
preparing a glass disk for information recording media having an outer peripheral edge surface and an inner peripheral edge surface; and
smoothing at least one of the outer peripheral edge surface and the inner peripheral edge surface of the glass disk by melt-heating to a temperature at or above a softening point of the glass by irradiating with at least one laser beam,
wherein both the outer peripheral edge surface and the inner peripheral edge surface are melt-heated in the smoothing step.

20. A method as claimed in claim 19, wherein the smoothing step comprises emitting a laser beam from a single laser oscillator, and alternately irradiating the emitted laser beam onto the inner peripheral edge surface and the outer peripheral edge surface.

21. A method as claimed in claim 19, wherein the smoothing step comprises emitting a laser beam from a single laser oscillator, splitting the laser beam into two split laser beam, and simultaneously irradiating the two split laser beams onto the inner peripheral edge surface and the outer peripheral edge surface respectively.

22. A method as claimed in claim 19, wherein the smoothing step comprises emitting a laser beam from each of two laser oscillators, and irradiating the laser beam emitted from one of the laser oscillators onto the inner peripheral edge surface, and irradiating the laser beam emitted from the other laser oscillator onto the outer peripheral edge surface.

23. A method of manufacturing a glass substrate for information recording media, comprising the steps of:
preparing a glass disk for information recording media having an outer peripheral edge surface and an inner peripheral edge surface; and
smoothing at least one of the outer peripheral edge surface and the inner peripheral edge surface of the glass disk by melt-heating to a temperature at or above a softening point of the glass by irradiating with at least one laser beam,
wherein the at least one laser beam is a divergent beam.

24. A method of manufacturing a glass substrate for information recording media, comprising the steps of:
preparing a glass disk for information recording media having an outer peripheral edge surface and an inner peripheral edge surface; and
smoothing at least one of the outer peripheral edge surface and the inner peripheral edge surface of the glass disk by melt-heating to a temperature at or above a softening point of the glass by irradiating with at least one laser beam,
wherein the glass disk is rotated during the smoothing step such that a speed of the inner peripheral edge surface relative to the laser beam is in a range of 0.02 to 5.0 m/minute.

25. A method of manufacturing a glass substrate for information recording media, comprising the steps of:
preparing a glass disk for information recording media having an outer peripheral edge surface and an inner peripheral edge surface; and
smoothing at least one of the outer peripheral edge surface and the inner peripheral edge surface of the glass disk by melt-heating to a temperature at or above a softening point of the glass by irradiating with at least one laser beam,
wherein a ratio of an energy density of the laser beam on the outer peripheral edge surface to an energy density of the laser beam on the inner peripheral edge surface is more than 1.

26. A method as claimed in claim 25, wherein the ratio of the energy density of the laser beam on the outer peripheral edge surface to the energy density of the laser beam on the inner peripheral edge surface is in a range of 2 to 5.

27. A method of manufacturing a glass substrate for information recording media, comprising the steps of:
preparing a glass disk for information recording media having an outer peripheral edge surface and an inner peripheral edge surface; and
smoothing at least one of the outer peripheral edge surface and the inner peripheral edge surface of the glass disk by melt-heating to a temperature at or above a softening point of the glass by irradiating with at least one laser beam,
wherein all or part of the glass disk is heated using a resistive heater before or during the smoothing step.

28. A method as claimed in claim 21, wherein a ratio of an energy density of the laser beam on the outer peripheral edge surface to an energy density of the laser beam on the inner peripheral edge surface is more than 1.

29. A method as claimed in claim 22, wherein a ratio of an energy density of the laser beam on the outer peripheral edge surface to an energy density of the laser beam on the inner peripheral edge surface is more than 1.

30. A method as claimed in claim 23, wherein a ratio of an energy density of the laser beam on the outer peripheral edge surface to an energy density of the laser beam on the inner peripheral edge surface is more than 1.

31. A method as claimed in claim 24, wherein a ratio of an energy density of the laser beam on the outer peripheral edge surface to an energy density of the laser beam on the inner peripheral edge surface is more than 1.

32. A method as claimed in claim 28, wherein the ratio of the energy density of the laser beam on the outer peripheral edge surface to the energy density of the laser beam on the inner peripheral edge surface is in a range of 2 to 5.

33. A method as claimed in claim 29, wherein the ratio of the energy density of the laser beam on the outer peripheral edge surface to the energy density of the laser beam on the inner peripheral edge surface is in a range of 2 to 5.

34. A method as claimed in claim 30, wherein the ratio of the energy density of the laser beam on the outer peripheral edge surface to the energy density of the laser beam on the inner peripheral edge surface is in a range of 2 to 5.

35. A method as claimed in claim 31, wherein the ratio of the energy density of the laser beam on the outer peripheral edge surface to the energy density of the laser beam on the inner peripheral edge surface is in a range of 2 to 5.

* * * * *